United States Patent [19]

Tuson

[11] 4,141,221
[45] Feb. 27, 1979

[54] MEANS FOR FITTING PACKING BETWEEN TWO COMPONENTS, SUCH AS PIPES, CAPABLE OF RELATIVE MOVEMENTS, IN PARTICULAR COAXIAL MOVEMENTS

[75] Inventor: Samuel Tuson, Mesnil-le-Roi, France

[73] Assignee: Entreprises d'Equipements Mecaniques et Hydrauliques E.M.H., Boulogne, France

[21] Appl. No.: 805,479

[22] Filed: Jun. 10, 1977

[30] Foreign Application Priority Data

Jun. 17, 1976 [FR] France ............................... 76 18407

[51] Int. Cl.$^2$ ................................................ F16L 1/04
[52] U.S. Cl. ....................................... 29/450; 285/325; 405/158
[58] Field of Search ......................... 277/35, 40, 44, 1; 61/86, 105, 110, 111, 112, 113, 69 R; 285/325; 166/77.5, 85, 0.6; 29/450

[56] References Cited

U.S. PATENT DOCUMENTS

| | | | |
|---|---|---|---|
| 2,692,152 | 10/1954 | Tremolada | 277/44 |
| 2,994,342 | 8/1961 | Stillwagon | 285/325 X |
| 3,741,296 | 6/1973 | Morman et al. | 166/0.6 |
| 3,982,727 | 9/1976 | Nelimarka | 285/325 X |
| 4,070,045 | 1/1978 | Colter et al. | 285/325 |

FOREIGN PATENT DOCUMENTS

| | | | |
|---|---|---|---|
| 1171097 | 11/1969 | United Kingdom | 285/325 |
| 1208834 | 10/1970 | United Kingdom | 61/95 |

*Primary Examiner*—Dennis L. Taylor
*Attorney, Agent, or Firm*—Larson, Taylor and Hinds

[57] ABSTRACT

A cassette loaded with a resilient packing is used to connect a pipe on the sea bed to one end of a hollow shaft forming part of the crosspiece of a cardan joint at the base of an articulated column mounted on the sea bed. The resilient packing comprises a stack of rubber rings and metallic washers disposed between end rings and capable of being deformed in torsion, the packing in use being compressed between an abutment on the end of the hollow shaft in the cardan joint and an abutment on the adjacent end of the pipe. The cassette comprises a tubular body which can be fitted in or removed from a housing for a bearing of the cardan joint, the end rings of the packing projecting through the opposite ends of the tubular body of the cassette. The cassette is fitted with jacks for compressing the packing, and wedges for retaining the packing in a compressed state until the cassette is fitted in the bearing housing, whereupon the jacks are again operated to compress further the packing and enable the wedges to be removed. Release of the jacks then allows the packing to expand within the cassette and engage the ends of the packing against the ends of the hollow shaft and pipe so as to form a connection therebetween.

14 Claims, 2 Drawing Figures

MEANS FOR FITTING PACKING BETWEEN TWO COMPONENTS, SUCH AS PIPES, CAPABLE OF RELATIVE MOVEMENTS, IN PARTICULAR COAXIAL MOVEMENTS

This invention relates to a method and apparatus for fitting and removal of a resilient packing between two components, such as in particular ends of pipes, capable of relative movements, generally coaxial movements, and it relates more particularly, among other applications, to apparatus of this kind to be provided at the base of articulated columns for oil installations at sea, such as are described in particular in the Applicants' French Pat. No. 1,519,891.

Such installations, in particular those used as loading columns, production columns or waste-gas burning columns, have at their base, on the sea bed, a cardan joint to which are led pipelines adapted to be connected to one or more pipes running up the columns, these pipelines and pipes being intended for the flow of liquid (oil) or gas.

In these installations, it is advantageous to cause the fluids to pass, at the location of the junction of the pipes, through the hollow shafts and bearings of the cross-piece or head of the cardan joint. In order to take account of the slight relative angular movements of the shafts, it is then necessary to provide, between the cardan joint and the pipelines or pipes ending thereat, deformable packings capable of working under torsion. These torsion packings comprise, in particular, a stack of rubber rings and metal rings, according to the Applicants' French Pat. No. 2,251,237. The stack is introduced, in a state of precompression, between flanges or abutments which are fast with the elements to be joined together and is then relaxed or released so as to bear, while still being compressed, against the said abutments.

The present invention relates to a method and apparatus adapted to enable the fitting or removal of these packings to be secured under the best conditions.

SUMMARY OF THE INVENTION

The invention consists, principally, in restoring to a cassette or box into which the packing is introduced, in combination with jack or other deviced mounted in said cassette and adapted to ensure the axial compression or decompression of the packing, this cassette being introduced, on fitting, in a precompressed state and being guided inside a seat fast with one of the two parts in relative movement, and in particular inside a bearing body, in such manner that the ends of the packing can present themselves correctly opposite the corresponding ends of the said parts, after which, the pressure of the aforesaid compression system being released, contact is established, still under pressure, between the respective ends to be joined together, the same operations having to be effected in reverse order for removal.

The packing (the rubber rings and the reinforcements) is rendered fast, at both its ends, with end flanges capable of axial movements inside the cassette, one of these flanges being prevented from turning, while the other flange, on the other hand, is capable of following the relative movements of rotation of the two parts or pipe ends to be connected.

Advantageously, brushing means are provided at the ends of the cassette to enable cleaning of the respective ends of the two parts between which the packing is inserted to be carried out on fitting thereof.

According to yet another arrangement, safety clamps can be provided to render the packing rigid in a positive manner with the ends of the parts to be connected, although good fluid-tightness is already obtained by the pressure remaining exterted by the packing at the end of the fitting operation.

Apart from these arrangements, the invention comprises certain other arrangements which are preferably used at the same time which will be discussed more explicitly hereinafter.

The invention relates more particularly to a certain mode of application (that in which it is applied to the means for fitting or removing packings at the base of columns articulated on the sea bed), and to certain embodiments of the said arrangements; and it relates, more particularly still and by way of new industrial products, to means of the kind in question comprising the application of these same arrangements, as well as to the special elements adapted for their construction and to assemblies, in particular articulated columns, using such means.

The invention can be clearly understood, in any case, with the aid of the following additional description and of the accompanying drawings, which additional description and drawings, of course, are given above all by way of indication.

BRIEF DESCRIPTION OF THE DRAWING FIGURES

FIG. 1 of these drawings shows in partial perspective the base of an articulated column, for an oil installation, with a cardan joint, and resilient packings to be interposed between the ends of the cardan joint head, which is assumed to be hollow and pipe ends some of which are on the bottom, while the others are carried by the column, the packings being mounted in cassettes which are visible in the course of the fitting process and the whole being in accordance with the invention.

FIG. 2 shows, in horizontal half-section on the line II—II in FIG. 1 and in elevation, one of these cassettes with its packing, the cassette being assumed to be in a precompressed state and in position in the bearing designed to receive it, the whole in accordance with the invention.

DETAILED DESCRIPTION OF THE ILLUSTRATED EMBODIMENTS

According to the invention, and more particularly according to that one of its modes of application and to those embodiments of its various parts to which it appears appropriate to give preference, it being proposed, in the case of a cardan joint at the base of an articulated column for an oil or other installation, with resilient packings, to install means for placing these packings in position or wthdrawing them, this is set about as follows or in a similar manner.

Figure 1:
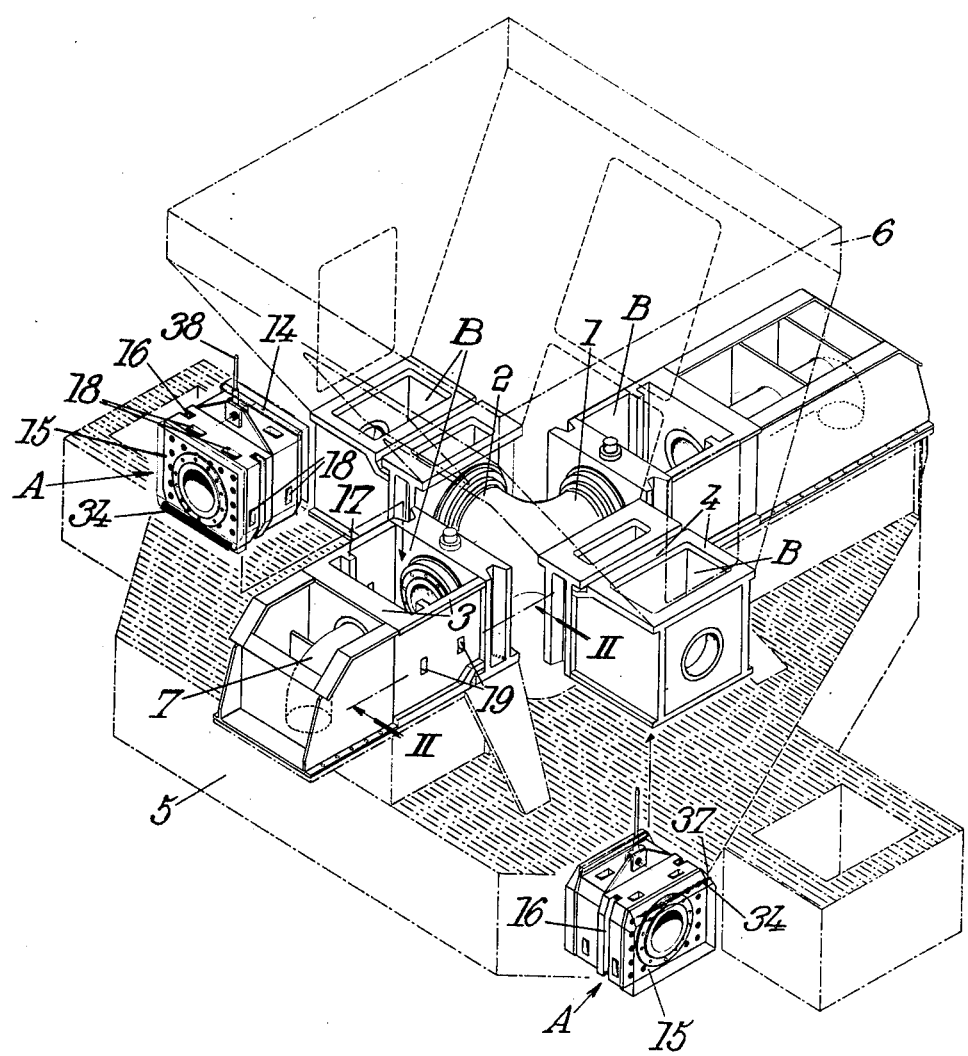

FIG. 1 shows, in perspective and in order to give a clear idea, a cardan joint head to be provided between a bedplate 5 fixed to the sea floor and the lower part of the articulated column.

This universal joint head comprises essentially two hollow cylindrical shafts or elements 1 and 2 disposed at right angles and the ends of which are mounted for rotation in corresponding bearings, two of these bearings 3 being fixed, that is to say fast with the bedplate 5 resting on the sea bed, while the other bearings 4 are movable, being fast with the base of the column 6.

The interior of the head is adapted to ensure the passage of the fluid (oil, gas) between, on the one hand, a fluid circuit comprising pipe branches 7 at the ends of a pipeline located on the bottom, the pipes being connectable to the shafts 1 of the said head and carried by the bearings 3, and, on the other hand, another circuit comprising pipes (not shown) running up the column and adapted to be connected at their base to the shafts 22 carried by the bearings 4.

Figure 2:
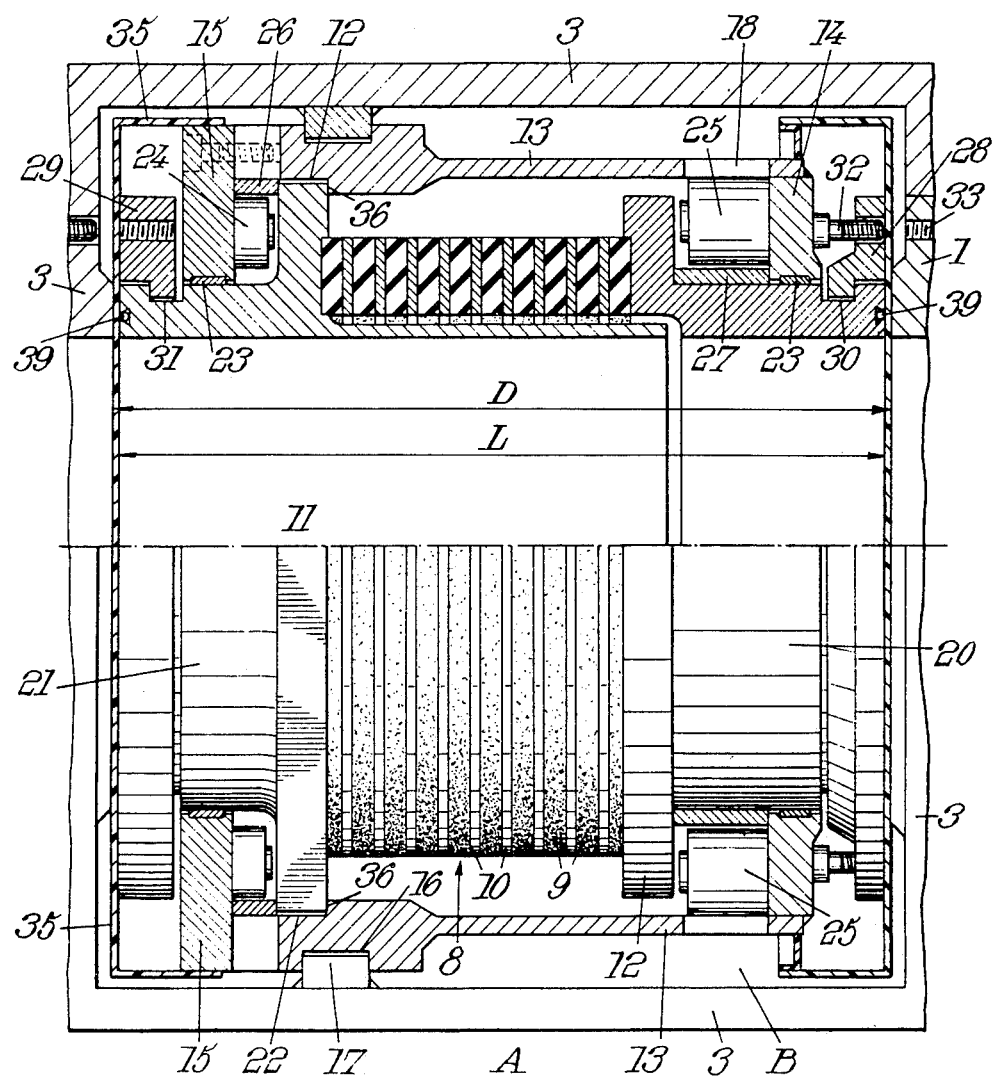

By reason of the relative angular movements of the bearings with respect to the shafts or cylindrical elements 1, 2 of the universal joint head, resilient packings such as can be seen at 8 in FIG. 2 and constituted, for example, by a stack of rubber rings 9 and metal rings 10 are interposed between the ends of said shafts and the corresponding ends of the pipes co-operating with them, such packings being able to deform under torsion around their central axis.

The assembly is mounted in such manner that, on fitting, the resilient packings in question are subjected to an axial-precompression stress, so that their over-all axial length (including the end flanges) L, which is initially greater than the distance D (FIG. 2) between the abutment elements against which they are to bear, is temporarily brought by pressure means to a length less than D, to permit their introduction between the said elements, after which the pressure means are released, so that the packings bear, while remaining compressed, against the said abutment elements.

According to the invention, in order to carry out this fitting under precompression, recourse is had to kinds of cassettes or boxes, in each of which the packing in question is previously mounted and subjected to pressure means which the cassette comprises and which can be operated easily from outside.

In such a cassette, designated generally by the reference A in FIG. 1, which is adapted to be introduced and guided inside a suitable seat or housing B formed in the corresponding bearing, the packing is guided in such manner that:

on the one hand, once it has been fitted, it is possible for the packing to perform axial movements, and, on the other hand, it is also able to perform torsional movements about its axis, for which purpose, for example, it is arranged that one of its end flanges 11 (FIG. 2) is fast in relative rotation with the corresponding bearing (in this case, the fixed bearing 3), while the other flange 12 is free to turn about its axis (in this case, by turning with the end of the cardan joint head 1).

In order to produce these conditions, procedure, for example, is in accordance with the embodiment illustrated.

According to this embodiment, it has been assumed that the housing B is of parallelepipedal form and that a similar form is given to the cassette A, which essentially comprises, for instance, a moulded, welded or forged steel body 13 forming a box with an end wall 14 and a removable cover 15.

In order to guide the cassette on its introduction into the housing B of the bearing, guide means are provided, such as lateral grooves 16 formed in the cassette and adapted to co-operate with corresponding projections 17 of the housing, which, after fitting and closing of the housing, ensures that the latter and the cassette are rendered perfectly fast with each other.

Openings are moreover formed at 18 and 19, respectively, in the cassete and the housing to enable certain parts, in particular the wedges mentioned hereinafter, to be handled from outside if necessary.

As regards more generally the mounting of the packing 8 in the cassette defined in this way, it is arranged, for example:

that the end flanges 11, 12 of the packing are extended by collars 20, 21 adapted to extend through the end wall 14 and the cover 15, respectively, in order to be able to bear with pressure, at the end of the fitting operation, against the corresponding parts, that is to say in the case of FIG. 2 against the cardan joint head 1 and a bearing abutment 3, and that the end flange 11, on the side where the bearing is located, is fast therewith, while the flange 12, on the other hand, is free to rotate.

In order to render the flange 11 and the bearing 1 fast with each other, the said flange, for example, is given a square shape, its opposite sides being fitted against a corresponding guide 22 of the cassette body. The flange 12, on the other hand, is cylindrical and free to rotate.

The centring, guiding and sliding in the axial direction, of the collars 20 and 21 are obtained by means of rings 23 of self-lubricating material.

The above assembly is moreover completed by the pressure means enabling a precompression to be exerted at will and to be maintained therein during the fitting operation or the pressure to be released to allow the packing to expand freely towards the bearings surfaces such as 1 and 3, which means are constituted with advantage by jacks, some of which 24 are carried, for example, by the cover of the cassette and adapted to act on the flange 11, while others 25 are carried, for example, by the body 13 or the end wall 14 and are adapted to act on the flange 12.

With these jacks there are combined wedging means adapted to maintain the packing in the state of precompression on fitting, these wedges having to be removed at the end of the fitting operation to release the packing towards its bearing surfaces (it being possible to provide any other locking means).

These wedges can be seen at 26 and 27, respectively, in FIG. 2, for the two sets of jacks co-operating with the end wall 14 and the cover 15, these wedges being handleable through the orifices such as 18 and 19, it being understood that any other actuating methods, in particular remote controlled, could be provided.

Advantageously, means are furthermore added for ensuring positive fixing between the corresponding ends to be connected, these means being constituted, for example, by clamps in the form of segments, such as 28, 29, co-operating with grooves 30, 31 in the collars 20 and 21, which clamps will be fixed at the end of the operation by screws or bolts such as can be seen at 32, 33 on the right of FIG. 2.

According to yet another arrangement of the invention, means such as brushes are provided on the front and rear bearing surfaces of the cassette adapted to be presented in front of the parts to be connected (such as 1, and 3, FIG. 2), in order to enable the said bearing surfaces to be cleaned.

These brushes, which are shown diagrammatically at 34 in FIG. 2, can conveniently be carried by covers 35 of Teflon (PTFE) or of other plastics material, which will constitute at the same time a good protection for the surfaces which they cover.

It is to be noted that the front surfaces could be chamfered, as indicated at 37 in FIG. 1, in order to facilitate introduction into the housing B.

As a result of which an assembly which operates in the following manner is obtained.

Firstly, as regards the mounting of the packings in their cassettes, this is carried out in a workshop or on a boat close to the platform (or even on the platform itself). The introduction of the packing unit into the interior of the cassette, which is already provided with the jacks 25, is carried out and then the cover 15, which is itself provided with the jacks 24, is placed in position. It is to be noted, however, that the jacks may also be placed in position by introducing them through orifices 18 in the body of the cassette.

This having been done, the jacks 24 of the cover 15 are first actuated, which ensures contact of the end flange 11 against a bearing surface 36 of the body 13. The wedges 26 are then placed in position through the holes 18 provided for this purpose.

The jacks 25 are then actuated until the packing 8 is compressed to the desired degree of compression, after which the wedges 27 are placed in position.

The jacks can then have their pressure released, the precompression in the packing remaining owing to the wedges. The clamps 28, 29 together with their bolts are then fitted on the cassette and the front surfaces of the cassette fitted with the covers 35 carrying the brushes 34.

To place such a cassette in position from a boat or the platform, it is lowered by a cable such as 38 (FIG. 2) and is presented opposite the seat of the corresponding housing B. Due to the rib 17, the cassette slides in. It is to be noted, moreover, that this rib is provided asymmetrically with respect to the vertical axis in the centre of the housing so as to avoid any mistake in this way and, consequently, prevent any possible error in the respective positions of the two end flanges 11 and 12.

When the cassette is placed in position, which has the effect of cleaning the supporting ends of the elements 1 and 3 thoroughly due to the brushes 34, the covers 35 are removed by a sliding action.

All is then ready for decompression of the joint. To this end, the jacks are again operated to enable the wedges 26 and 27 to be removed. This operation having been performed, the fluid under pressure in the jacks is released, so that the joint 8 expands freely and bears with pressure against the corresponding bearing surfaces at 1 and 3. Fluid-tightness is obtained with complete safety with the co-operation of toroidal seals 39.

Safety can be further improved, however, by tightening the bolts of the clamps 28 and 29.

The operations for removing a packing 8 for the purpose of its replacement are effected similarly in reverse order.

To conclude, due to the invention, an assembly can be produced which has, in comparison with already existing methods and devices of the kind in question, numerous advantages, in particular:

that of permitting the fitting and removal of the packings under ideal conditions of simplicity at a cost which is not very high, that of permitting the cleaning of the bearing surfaces, that of ensuring, due to the cassette, protection of the rubber in the packing against ultraviolet radiation and all other causes of deterioration, during storage on land, and that of ensuring, still due to the cassette, good protection in the fitted position, in particular against fish and against underwater vegetation.

As is obvious and as is moreover already apparent from the foregoing, the invention is by no means limited to those modes of application and embodiments which have been more especially considered; on the contrary, it covers all modifications. In particular, it is possible to secure the fitting of all sliding or swivelling packings, joints or other couplings, composite or monolithic, having to be introduced between any two parts and to be withdrawn therefrom with ease. Thus, in addition to the articulated platforms hereinbefore mentioned, the invention could be applied to buoys with a rigid leg articulated to the sea bed or elsewhere, to articulated loading arms and to all systems comprising packings or couplings to be introduced in a compressed state.

It is moreover appropriate to add that, instead of the jacks being mounted inside the cassette, they could be external, while acting on the joint through the walls of the said cassette.

Moreover, according to yet another arrangement of the invention, it will be advantageous to use for the operations of lowering and raising the cassettes a caisson or cage having floats and ballast tanks which is adapted to reduce the apparent weight of the assembly, the caisson being, for example, of the type described in the patent application filed in the same name under No. 76 17779 on 11.06.1976.

I claim:

1. In a method for fitting or removal of a resilient packing between two components, such as pipes, capable of relative coaxial movements, including the steps of compressing axially said packing to a length smaller than the axial distance between said components in their working position, introducing said compressed packing between said components and then partially releasing said packing from the stress resulting from said axial compressing, the improvement comprising introducing said packing into a cassette adapted to be inserted between the two components in their working position, compressing said packing to said axial length within said cassette, introducing said cassette containing said axially compressed packing between said components so that the ends of said packing are opposite to the ends of said components, and releasing said packing to enable it to bear with pressure by its axial ends against said ends of said components, the same operations being effected in the reverse order for removal of said resilient packing from between said two components.

2. A method as claimed in claim 1 wherein the step of compressing said packing is effected by jacks carried by said cassette.

3. Apparatus for use in fitment or removal of a resilient packing in a bearing housing between two components, such as pipes, capable of relative coaxial movements, comprising a cassette and a resilient packing, said resilient packing being tubular and having flanges at the ends thereof, said cassette comprising a hollow body for containing said resilient packing and constructed and arranged to be introduced into and fixed in a bearing housing as aforesaid, said hollow body having an end wall and a removable cover, means for locating said packing in said hollow body with the ends of the packing being exposable to coaxially mate with said components when said cassette is fitted in a bearing housing, and jacks operable on said end flanges to effect axial compression and extension of said packing, whereby, with said packing mounted in said cassette, said jacks can be operated to compress said packing to an axial length less than the axial distance between the two components, said cassette can be introduced into said bearing housing so that the ends of said packing are opposite the ends of the two components, and said packing can be released to enable it to bear with pressure by its axial ends against the ends of the two components.

4. A cassette according to claim 3, characterised in that said jacks are mounted inside said hollow body and adapted to be operated from outside the hollow body.

5. A cassette according to claim 3, characterised in that said hollow body is provided with guides on its outer surface to mate with complementary guides in a bearing housing to locate the body in the housing.

6. A cassette according to claim 5, characterised in that said guides are arranged asymmetrically with respect to the central axis of the cassette to eliminate error in positioning the cassette in the bearing housing.

7. A cassette according to claim 3, characterised in that one of said end flanges is non-circular, and the hollow body is formed with guide means cooperating with said non-circular end flange to prevent rotation thereof relative to said hollow body, the other end flange being mounted in the hollow body for free rotational movement therein.

8. A cassette according to claim 3, characterised in that said end flanges are formed with tubular collars projecting externally through said end wall and cover, the collars being adapted to establish continuity between passages in the two components.

9. A cassette according to claim 3 and fitted with two sets of jacks for precompression of the packing, characterised in that said hollow body is provided with abutments for engagement with the end flanges of the packing in the compressed state, one set of the jacks being carried by said cover and operable to press the corresponding end flange of the packing against its abutment, and the other set of jacks being operable in the opposite direction to press the corresponding end flange against its abutment.

10. A cassette according to claim 3, including wedges cooperating with said hollow body and the end flanges on the packing to maintain the packing in a pre-compressed state and enable introduction of the assembly into the bearing housing.

11. A cassette according to claim 10, characterised in that the said hollow body is provided with passages for introduction of said wedges into the hollow body.

12. A cassette according to claim 10, characterised in that said wedges are constructed and arranged to be handled remotely from outside the cassette.

13. A cassette according to claim 3, including clamps operable to clamp the ends of the packing to the ends of the two components to be connected by said packing.

14. A cassette according to claim 3, characterised in that brushing means are provided on the flanks of the hollow body of the cassette to enable cleaning of the surfaces of the ends of the components to be connected by the packing to be effected at the time of fitting the packing.

* * * * *